(12) United States Patent
Chae et al.

(10) Patent No.: US 11,922,667 B2
(45) Date of Patent: Mar. 5, 2024

(54) OBJECT REGION IDENTIFICATION DEVICE, OBJECT REGION IDENTIFICATION METHOD, AND OBJECT REGION IDENTIFICATION PROGRAM

(71) Applicant: Rakuten Group, Inc., Tokyo (JP)

(72) Inventors: Yeongnam Chae, Tokyo (JP); Mijung Kim, Tokyo (JP); Preetham Prakasha, Tokyo (JP)

(73) Assignee: Rakuten Group, Inc., Tokyo (JP)

(*) Notice: Subject to any disclaimer, the term of this patent is extended or adjusted under 35 U.S.C. 154(b) by 417 days.

(21) Appl. No.: 17/269,570

(22) PCT Filed: Apr. 28, 2020

(86) PCT No.: PCT/JP2020/018114
§ 371 (c)(1),
(2) Date: Feb. 19, 2021

(87) PCT Pub. No.: WO2021/220398
PCT Pub. Date: Nov. 4, 2021

(65) Prior Publication Data
US 2022/0122340 A1  Apr. 21, 2022

(51) Int. Cl.
*G06V 10/22* (2022.01)
*G06T 7/269* (2017.01)
(Continued)

(52) U.S. Cl.
CPC .......... *G06V 10/22* (2022.01); *G06T 7/269* (2017.01); *G06T 7/70* (2017.01); *G06V 10/40* (2022.01);
(Continued)

(58) Field of Classification Search
CPC ............ G06T 2207/10016; G06T 7/20; G06T 2207/20081; G06T 7/00; G06T 7/215;
(Continued)

(56) References Cited

U.S. PATENT DOCUMENTS 10,825,188 B1 * 11/2020 Tan ........................ G06T 7/11
2018/0268208 A1 * 9/2018 Wei ................... G06F 18/2413
(Continued)

FOREIGN PATENT DOCUMENTS

CN  111275518 A * 6/2020 ......... G06K 9/00362
JP  6230751 B1  11/2017
(Continued)

OTHER PUBLICATIONS

Ramprasaath R. Selvaraju et al., "Grad-CAM: Visual Explanations from Deep Networks via Gradient-based Localization", Oct. 7, 2016, 2 pages.
(Continued)

*Primary Examiner* — Ian L Lemieux
(74) *Attorney, Agent, or Firm* — Sughrue Mion, PLLC

(57) ABSTRACT

To accurately identify a region corresponding to a position where an object is preset in an image, an object region identification device acquires a first frame image and a second frame image that are temporally successive. The device inputs the first frame image to a model that identifies an object in an image and acquires position information, the position affecting identification of an object in the first frame image. The device acquires motion information indicating a motion of the object in the first frame image based on the first frame image and the second frame image. The device generates, based on the acquired position information and motion information, region information indicating a region in the first frame image, the region corresponding to a position where the object is present.

17 Claims, 9 Drawing Sheets

(51) Int. Cl.
*G06T 7/70* (2017.01)
*G06V 10/40* (2022.01)

(52) U.S. Cl.
CPC ............... *G06T 2207/10016* (2013.01); *G06T 2207/20081* (2013.01)

(58) Field of Classification Search
CPC . G06T 7/269; G06T 7/70; G06T 2207/30201; G06T 7/248; G06T 7/10; G06T 2207/20076; G06T 2207/20084; G06T 2207/20224; G06T 2207/30196; G06V 10/40; G06V 10/82; G06V 10/22; G06V 20/52; G06V 40/28; G06V 10/25; G06V 10/56; G06V 20/00; G06V 40/113; G06V 40/172; G06V 40/20; G06V 10/255; G06V 10/26; G06V 10/454; G06V 10/62; G06V 10/764; G06V 10/772; G06V 10/774; G06V 10/776; G06V 10/955; G06V 20/46; G06V 20/58; G06V 20/68; G06V 40/107; G06F 17/16; G06F 3/01; G06F 3/017; G06F 3/0304; G06F 18/214; G06F 18/217; G06F 18/22; G06F 18/2431; G06N 3/084; G06N 3/045
See application file for complete search history.

(56) References Cited

U.S. PATENT DOCUMENTS

| | | |
|---|---|---|
| 2019/0197345 A1 | 6/2019 | Sawada et al. |
| 2020/0086858 A1* | 3/2020 | Yao ................... B60W 30/0956 |
| 2020/0143150 A1* | 5/2020 | Nakamura ............. G06T 7/248 |
| 2020/0151905 A1* | 5/2020 | Ricco ..................... G06T 7/70 |
| 2020/0184718 A1* | 6/2020 | Chiu ....................... G06T 7/20 |
| 2020/0394460 A1 | 12/2020 | Shiraishi |
| 2021/0248378 A1* | 8/2021 | Sang ..................... G06V 20/42 |
| 2021/0275107 A1* | 9/2021 | Pitters .................... A61B 5/112 |
| 2021/0334579 A1* | 10/2021 | Lin ........................ G06V 20/46 |
| 2023/0132646 A1* | 5/2023 | Ratti ................... G06V 10/776 |
| | | 348/159 |

FOREIGN PATENT DOCUMENTS

| | | | | |
|---|---|---|---|---|
| KR | 2020061747 A | * | 6/2020 | ......... G06K 9/00342 |
| WO | 2019/171440 A1 | | 9/2019 | |

OTHER PUBLICATIONS

International Search Report for PCT/JP2020/018114 dated Jul. 14, 2020 [PCT/ISA/210].

* cited by examiner

OBJECT REGION IDENTIFICATION DEVICE, OBJECT REGION IDENTIFICATION METHOD, AND OBJECT REGION IDENTIFICATION PROGRAM

CROSS REFERENCE TO RELATED APPLICATIONS

This application is a National Stage of International Application No. PCT/JP2020/018114 filed Apr. 28, 2020.

TECHNICAL FIELD

The present invention relates to a technical field for mapping a position that affects identification of a class of an object in image recognition.

BACKGROUND ART

Conventionally, in computer vision, research and development of image recognition using a convolutional neural network (CNN) has been actively conducted. A CNN is capable of end-to-end learning from an image that serves as training data. Meanwhile, because a model using a CNN is complex, interpretation of the model is difficult. Thus, class activation mapping (CAM) has come to appear as one of methods for interpreting such a model (e.g., Non Patent Literature 1). When a CNN identifies a class of an object from an image, the CAM outputs a class activation map (or heat map, localization map) indicating a position that is a basis of the identification of the class. It can be said that this map roughly indicates a location where the object of the identified class is present in the image.

CITATION LIST

Non Patent Literature

Non Patent Literature 1: Ramprasaath R. Selvarajul, et al., "Grad-CAM: Visual Explanations from Deep Networks via Gradient-based Localization", [found on Mar. 3, 2020], [online], Oct. 7, 2016, Website <URL: https://arxiv.org/abs/1610.02391>

SUMMARY OF INVENTION

Technical Problem

However, it is a nature of the class activation map, not to accurately indicating an entire location in which an object of an identified class is present, but to tend to emphasize a location easy to distinguish from other classes, or the like. Therefore, even if simply using a CAM, it is difficult to accurately identify a region, such as a bounding box, surrounding the object in an image.

The invention of the application has been made in view of the above points, and an example of an object is to provide an object region identification device, an object region identification method, and an object region identification program which are capable of accurately identifying a region corresponding to a position where an object is preset in an image.

Solution to Problem

In order to solve the above problem, an aspect of the present invention is an object region identification device comprising: a frame image acquisition means that acquires a first frame image and a second frame image that are temporally successive; a position information acquisition means that inputs the first frame image to a model that identifies an object in an image and acquires position information indicating a position in the first frame image, the position affecting identification of an object in the first frame image; a motion information acquisition means that acquires motion information indicating a motion of the object in the first frame image based on the first frame image and the second frame image; and a region information generation means that generates, based on the acquired position information and motion information, region information indicating a region in the first frame image, the region corresponding to a position where the object is present.

According to the above aspect, region information indicating a region corresponding to a position where an object is present is generated based on position information and motion information. The position information indicates a position that affects identification of an object in a frame image. Therefore, the position information is likely to indicate a location of at least a certain area in the location where the object is present. The motion information indicates a motion of the object. Therefore, in a case where the object is in motion, the motion information is likely to indicate at least an entire location where the object is present. Therefore, by generating region information by using these pieces of information, it is possible to accurately identify a region corresponding to a position where the object is present in the image.

Another aspect of the present invention is the object region identification device, wherein the region information generation means generates the region information based on integrating the position information and the motion information.

According to the above aspect, among a plurality of areas in the frame image where motions are made, an area corresponding to a position that affects identification of an object is identified by integrating the position information and the motion information. Therefore, it is possible to accurately identify a region corresponding to a position where the object is present.

Yet another aspect of the present invention is the object region identification device, wherein the motion information acquisition means generates the motion information indicating a moving direction and a moving distance of the object for each of positions in the first frame image, and the region information generation means generates the region information based on adding up the position information and the motion information for each position.

According to the above aspect, a position that affects identification of the object is changed by a moving direction and a moving distance at the position.

Yet another aspect of the present invention is the object region identification device, further comprising a detection means that detects an object of the second frame image by inputting, to a second model that identifies an object in an image, an image of a region that is in the second frame image and is indicated by the acquired region information.

According to the above aspect, in a frame image, an image corresponding to a region indicated by generated region information is input to a model that identifies an object in the image. Therefore, the object in the frame image is identified by the model. Furthermore, a region corresponding to a position of the object is indicated by the region information. Therefore, the object in the frame image can be accurately detected. Furthermore, because highly accurate region information is automatically generated, it is possible to detect an object without machine learning that requires annotations of region information by a human.

Yet another aspect of the present invention is the object region identification device, further comprising a training means that trains the model based on the generated region information.

According to the above aspect, a model is trained based on automatically generated region information, and therefore, annotations of region information by a human is unnecessary for machine learning for identifying a region corresponding to a position of an object.

Yet another aspect of the present invention is the object region identification device, wherein the position information acquisition means further inputs the second frame image to the model and acquires a second position information indicating a position in the second frame image, the position in the second frame image affecting identification of an object in the second frame image, and the training means includes a first extraction means that extracts a first image of a region indicated by the acquired region information from the second frame image, a second region information generation means that generates, based on the acquired second position information, second region information indicating a region in the second frame image, the region in the second frame image corresponding to a position that affects identification of the object, a second extraction means that extracts, from the second frame image, a second image of a region indicated by the acquired second region information, and an update means that updates weights of the model based on the acquired first image and second image.

According to the present invention, weights of a model are updated based on a first image of a region in the second frame image, the region being indicated by region information generated based on position information and motion information, and a second image of a region in the second frame image, the region being indicated by second region information generated based on the second position information. In a case where a position that is indicated by position information and affects identification of an object in a first frame image is changed by a motion indicated by the motion information, a position after the change is considered to correspond to a position that affects identification of the object in the second frame image. Therefore, the model can be appropriately trained by using the first image and the second image.

Yet another aspect of the present invention is the object region identification device, wherein the training means further includes a first feature acquisition means that acquires a feature of the extracted first image, and a second feature acquisition means that acquires a feature of the extracted second image, and the update means updates weights of the model based on the acquired first feature and second feature.

According to the present invention, weights of a model are updated based on a feature of the first image and second image. The second region information indicates a region corresponding to a position that affects identification of an object in the second frame image. Therefore, a feature of the second image extracted from the region indicates a feature of an object to be detected. Thus, the model can be appropriately trained by, for example, weights being updated so that features of the first image and second image are close to each other.

Yet another aspect of the present invention is the object region identification device, wherein the position information is at least a part of a class activation map.

Yet another aspect of the present invention is the object region identification device, wherein the motion information is an optical flow.

Yet another aspect of the present invention is an object region identification method performable by a computer, the method comprising: a frame image acquisition step of acquiring a first frame image and a second frame image that are temporally successive; a position information acquisition step of inputting the first frame image to a model that identifies an object in an image and acquires position information indicating a position in the first frame image, the position affecting identification of an object in the first frame image; a motion information acquisition step of acquiring motion information indicating a motion of the object in the first frame image based on the first frame image and the second frame image; and a region information generation step of generating, based on the acquired position information and motion information, region information indicating a region in the first frame image, the region corresponding to a position where the object is present.

Yet another aspect of the present invention is an object region identification program executed by a computer, the program causing the computer to function as: a frame image acquisition means that acquires a first frame image and a second frame image that are temporally successive; a position information acquisition means that inputs the first frame image to a model that identifies an object in an image and acquires position information indicating a position in the first frame image, the position affecting identification of an object in the first frame image; a motion information acquisition means that acquires motion information indicating a motion of the object in the first frame image based on the first frame image and the second frame image; and a region information generation means that generates, based on the acquired position information and motion information, region information indicating a region in the first frame image, the region corresponding to a position where the object is present.

Advantageous Effects of Invention

According to the present invention, it is possible to accurately identify a region corresponding to a position where an object is preset in an image.

DESCRIPTION OF EMBODIMENTS

Hereinafter, an embodiment of the present invention will be described in detail with reference to the drawings. Described below is an embodiment of a case where the present invention is applied to an image processing device that performs learning for generating a model, which detects an object from an image, and that detects the object by using the generated model. Object detection includes at least identification of a region corresponding to a position of an object in an image. The object detection may be to identify both a class of the object and the region corresponding to the position where the object is present, or may be to identify a region corresponding to a position where a specific object or an object of a specific class is present. A device that executes learning and a device that performs object detection may be separate devices.

[1. Configuration of Image Processing Device]

Figure 1:
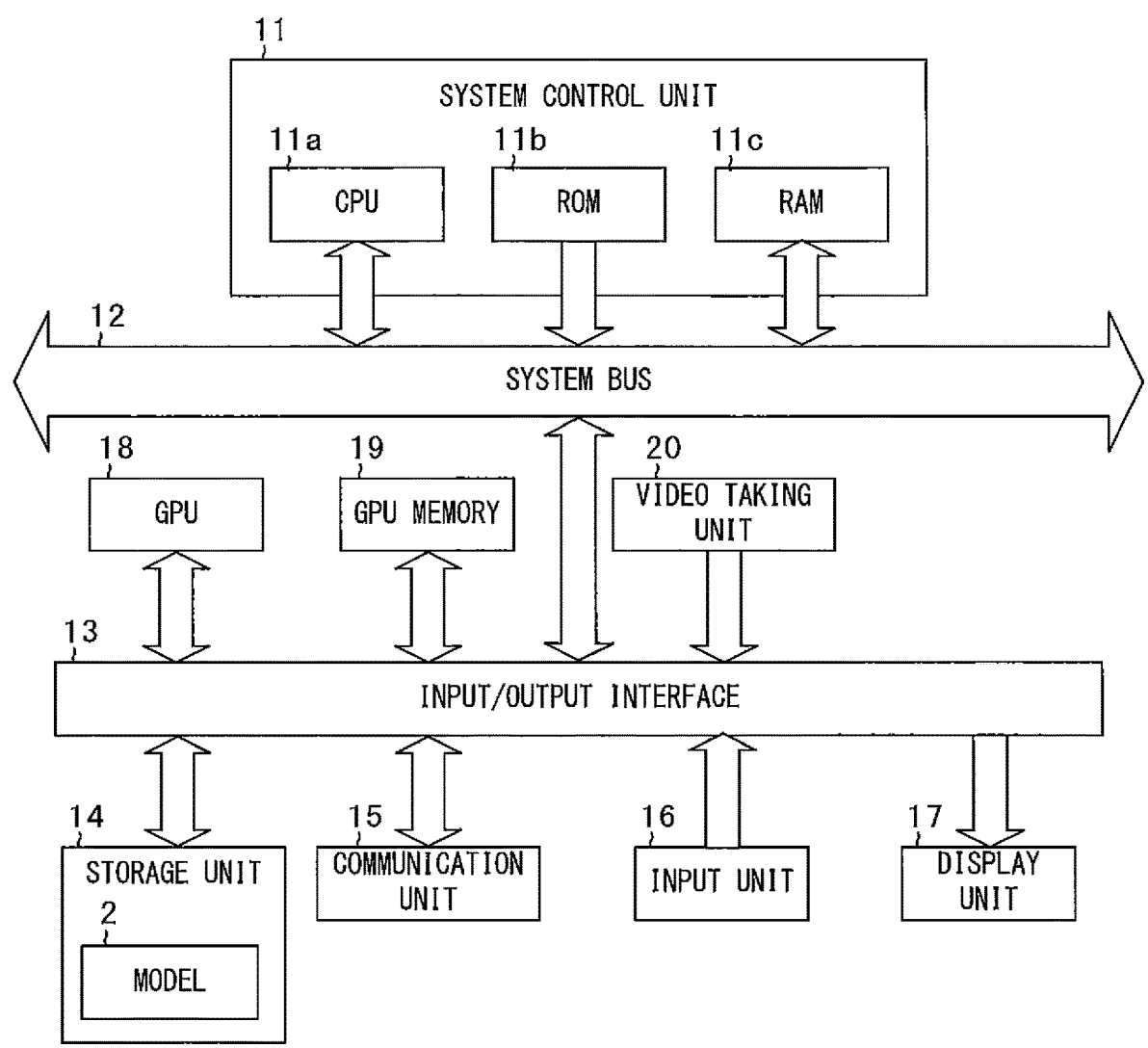
FIG. 1 is a block diagram illustrating an example of an overview configuration of an image processing device 1 according to an embodiment.

First, a configuration of an image processing device 1 will be described by using FIG. 1. FIG. 1 is a block diagram illustrating an example of an overview configuration of the image processing device 1 according to the present embodiment. As illustrated in FIG. 1, the image processing device 1 includes a system control unit 11, a system bus 12, an input/output interface 13, a storage unit 14, a communication unit 15, an input unit 16, a display unit 17, a graphics processing unit (GPU) 18, a GPU memory 19 (or a video RAM), and an video taking unit 20. The system control unit 11 and the input/output interface 13 are connected to each other via the system bus 12. Examples of the image processing device 1 include a server device, a personal computer, and the like.

The system control unit 11 includes a central processing unit (CPU) 11a, a read only memory (ROM) 11b, a random access memory (RAM) 11c, or the like.

The input/output interface 13 performs interface processing between the system control unit 11 and, the storage unit 14, the communication unit 15, the input unit 16, the display unit 17, the GPU 18, the GPU memory 19 and the video taking unit 20.

The storage unit 14 includes, for example, a hard disk drive, a solid state drive, or the like. The storage unit 14 stores a model 2 that was generated, training data used for generating the model 2, and the like. The training data includes video data and a label (Ground Truth) of a class of an object present in a video indicated by the video data. Examples of video data formats include H.264, MPEG-2, and the like. The storage unit 14 further stores an operating system, a program for model generation, a program for object detection, and the like. The training data and various programs may be, for example, acquired from a predetermined computer via a network, or may be recorded on a recording medium such as an optical disk, a memory card, or a magnetic tape and read via a drive device. In a case where a device that generates the model 2 and a device that performs object detection are separate devices, the generated model 2 may be transferred via a network or via a recording medium.

The communication unit 15 includes, for example, a network interface controller, or the like. The communication unit 15 is connected to other computers via a predetermined network such as the Internet or a local area network (LAN), and controls a state of communication with the computers.

The input unit 16 receives operation by an operator and outputs a signal corresponding to content of the operation to the system control unit 11. Examples of the input unit 16 include a keyboard, a mouse, a touch panel, and the like.

The display unit 17 includes, for example, a graphic controller, a display, and the like. The display unit 17 displays information such as images and text under control of the system control unit 11. Examples of panels for display include a liquid crystal panel, an organic light emitting (EL) panel, and the like.

The GPU 18 executes matrix operation, or the like, in machine learning under control of the system control unit 11. The GPU 18 performs pipeline processing of a plurality of calculations in parallel. The GPU 18 and the GPU memory 19 are connected. The GPU memory 19 stores data used for calculation by the GPU 18 and results of the calculation. Note that, in a case where the system control unit 11 executes all calculations in machine learning, the GPU 18 and the GPU memory 19 are unnecessary.

The video taking unit 20 includes, for example, a digital camera including a charge-coupled device (CCD) sensor, a complementary metal oxide semiconductor (CMOS) sensor, and the like. The video taking unit 20 takes a video based on control by the system control unit 11. The video taking unit 20 outputs video data indicating the taken video to the system control unit 11 or the storage unit 14. The device that executes learning is not required to include video taking unit 20 in a case where a device that executes learning and a device that performs object detection are separate devices. Furthermore, the image processing device 1 is not required to include the video taking unit 20 in a case where object detection is executed from video data acquired from another computer or recording medium instead of being executed in real time from a video taken by the video taking unit 20.

The image processing device 1 itself is not required to include at least one of the input unit 16, the display unit 17, the GPU 18, the GPU memory 19, and the video taking unit 20. At least one of these may be connected to the image processing device 1 by wire or wirelessly.

[2. Functional Overview of System Control Unit]

Figure 2:
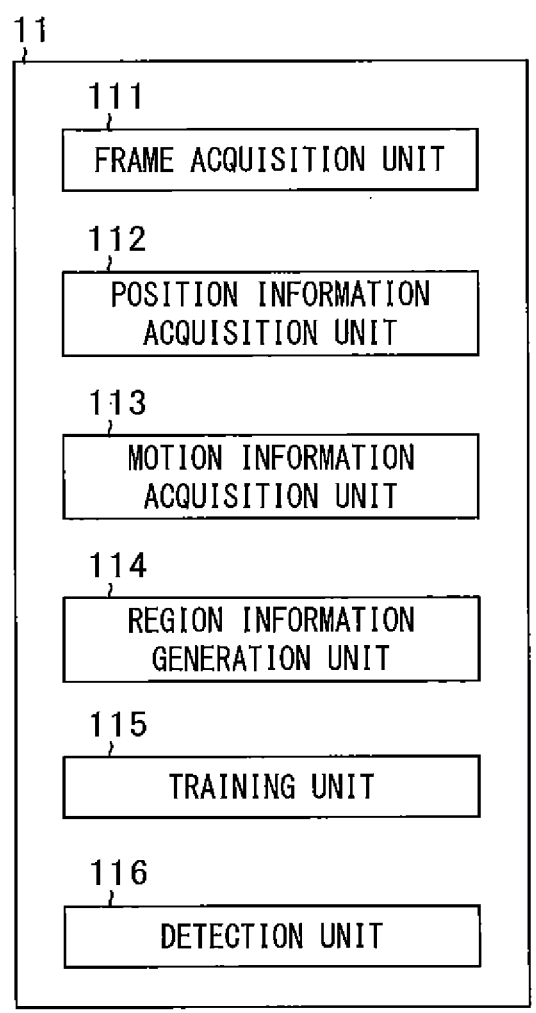
FIG. 2 is a diagram illustrating an example of a functional block of a system control unit 11 and GPU 18 of the image processing device 1 according to an embodiment.

Next, a functional overview of the system control unit 11 and GPU 18 will be described by using FIGS. 2 to 7. FIG. 2 is a diagram illustrating an example of the functional block of a system control unit 11 and GPU 18 of the image processing device 1 according to the present embodiment. The system control unit 11 and the GPU 18 function as a frame acquisition unit 111, a position information acquisition unit 112, a motion information acquisition unit 113, a region information generation unit 114, a training unit 115, a detection unit 116, or the like as illustrated in FIG. 2, by the CPU 11a reading and executing various codes, or the like, included in a program stored in the storage unit 14.

Figure 3:
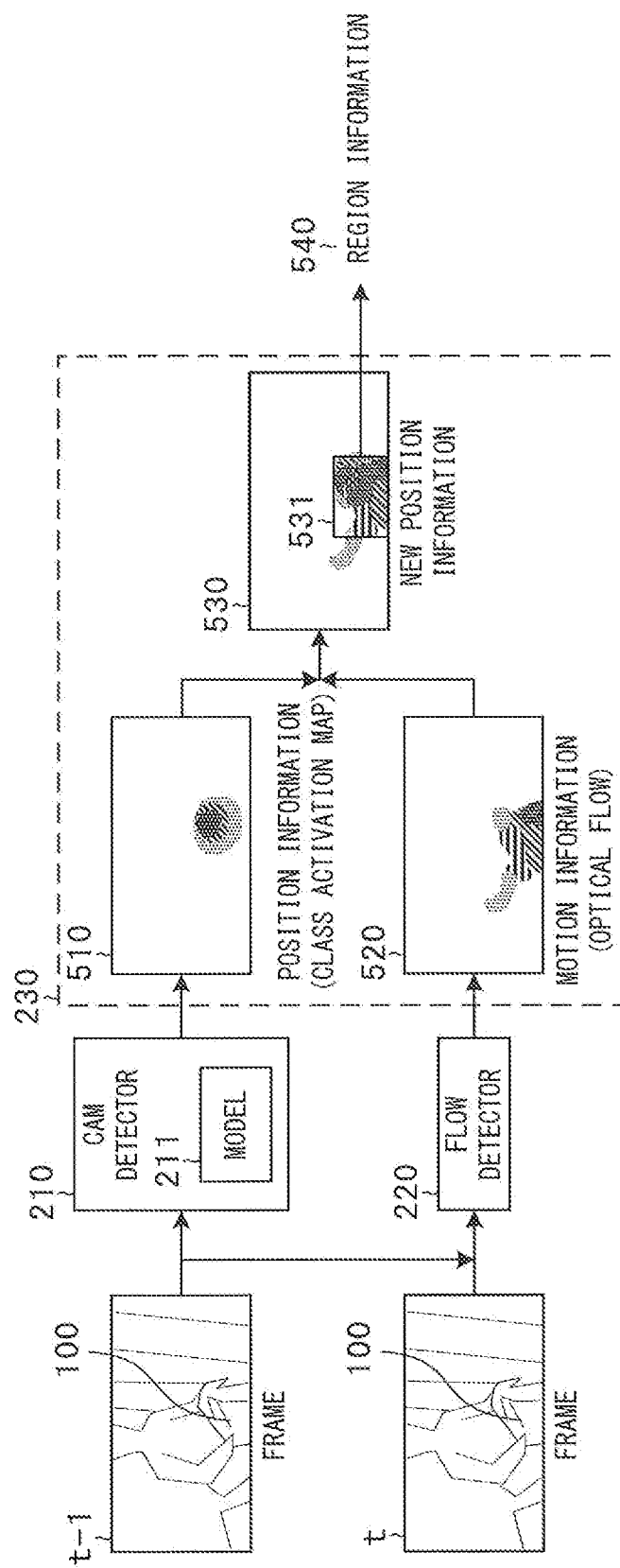
FIG. 3 is a diagram illustrating a configuration example of a model 2.

FIG. 3 is a diagram illustrating a configuration example of the model 2. As illustrated in FIG. 3, the model 2 includes a CAM detector 210, a flow detector 220, and a region estimation algorithm 230. The CAM detector 210 includes a model 211.

[2-1. Basic Functions]

The frame acquisition unit 111 acquires temporally successive frame images. The frame images are still images included in a video. It is assumed that an object 100 to be detected is shown in the video. It is assumed that the object 100 is moving in the video. Among the frame images included in the video, at least one frame image is not required to include the object 100. That is, the object 100 may move into or move out of a frame. Furthermore, the object 100 does not have to move at all over some frame images. The video includes temporally successive frames. The temporally successive frames are, for example, frames having successive times of taking them. For example, in a case where a frame rate is 30 fps, frames are taken at 1/30 second intervals. The frame acquisition unit 111 may sequentially acquire frame images from the video data according to an order of taking them. In FIG. 3, the frame acquisition unit 111 acquires, for example, a frame t−1 and a frame t. The frame t−1 is a t−1th frame image according to the taking order among the frame images included in the video. The frame t is a t-th frame image. Therefore, the frame t−1 and the frame t are temporally successive.

The position information acquisition unit 112 inputs the frame t−1 acquired by the frame acquisition unit 111 into the model 211. As a result, the position information acquisition unit 112 acquires position information 510 indicating a position in the frame t−1 and affects identification of the object 100 in the frame t−1. The model 211 identifies an object in an image. Therefore, the position information 510 indicates a position that affects the identification by the model 211. The model 211 may be a classifier. The model 211 may be, for example, a CNN. For example, the model 211 may include convolutional layers, pooling layers, fully connected layers, a softmax function, and the like. In the model 211, the convolutional layers and the pooling layers generate feature maps of the frame t−1. The fully connected layers extract features of the frame t−1 from the feature maps. From the extracted features, the softmax function generates a value indicating existence probability of each of classes in the frame t−1. Examples of the CNN include ResNet, GoogleNet, AlexNet, VGGNet, and the like. The CAM detector 210 generates position information. The position information acquisition unit 112 acquires position information from the CAM detector 210. The position that affects identification of the object 100 may be, for example, a position that is a basis of identification of the object 100. Furthermore, the position that affects identification of the object 100 may be a position that is important for identification of the object 100. Furthermore, the position that affects identification of the object 100 may be a position that distinguishes the object 100 from objects of classes different from the class of the object 100. Furthermore, the position that affects identification of the object 100 may be a position that causes, by a value of this position changing in feature maps generated by the model 211, a probability value output from the model 211 to significantly change as compared to a case of other positions. The position information 510 may be, for example, a class activation map generated by a CAM algorithm or a part of the class activation map. Examples of CAM algorithms include Grad-CAM, Grad-CAM++, Smooth Grad and the like. For example, when a class of a certain object is provided, the CAM detector 210 may calculate a gradient of a final layer of the model 211 for each of feature maps according to the class. The CAM detector 210 may calculate a weight of each of the feature maps based on the calculated gradient. The CAM detector 210 may generate position information 510 by weighting the feature maps and adding these feature maps together. The position information 510 may be, for example, a two-dimensional heat map showing a value indicating a degree of effect or a degree of importance on identification for each position. Alternatively, the position information 510 may be a position matrix indicating positions having a degree of effect or degree of importance equal to or more than a predetermined value. That is, the position information 510 may indicate an important position for identification of the object 100 in the frame t. The position information acquisition unit 112 may extract, from the activation map, positions having a degree of effect or degree of importance equal to or more than the predetermined value and generate the position matrix.

The motion information acquisition unit 113 acquires motion information 520 indicating a motion of the object 100 in the frame t−1 based on the frame t−1 and frame t acquired by the frame acquisition unit 111. The motion of the object 100 may be displacement of the object 100 between the frame t−1 and the frame t. In a relation between the frame t−1 and the frame t, the frame t−1 corresponds to the object 100 before the movement, and the frame t corresponds to the object after the movement. The motion information 520 may indicate, for example, a moving direction and a moving distance (or moving speed). For example, the motion information 520 may include a vector indicating a moving direction and moving distance for each position in the frame t−1. For example, the motion information 520 may indicate difference between coordinates of the position and coordinates after movement for each position in the frame t−1. For example, the motion information 520 may be an optical flow. For example, the motion information acquisition unit 113 inputs the frame t−1 and the frame t to the flow detector 220, and acquires the motion information 520 from the flow detector 220. The flow detector 220 may be a model including, for example, a CNN. Examples of the flow detector 220 include FlowNet, FlowNet 2.0, LiteFlowNet, and the like. A pre-trained model may be used as the flow detector 220. The flow detector 220 may be previously stored in the storage unit 14, and may be loaded into the RAM 14 or the GPU memory 19 when necessary. As a method for generating an optical flow, a method that does not use machine learning may be used. Examples of such a method include a block matching method, a gradient method, and the like.

Based on the position information 510 acquired by the position information acquisition unit 112 and the motion information 520 acquired by the motion information acquisition unit 113, the region information generation unit 114 generates region information 540 indicating a region in the frame t acquired by the frame acquisition unit 111 and corresponds to a position where the object 100 is present. The region corresponding to a position where the object 100 is present may be, for example, a region surrounding the object 100. A shape of the region may be, for example, rectangular. This region may be, for example, a bounding box. The region information 540 may include, for example, coordinates and size of the region. The coordinates of the region may be coordinates of a center or coordinates of any vertex. The size of the region may include height and width of the region.

Figure 4:
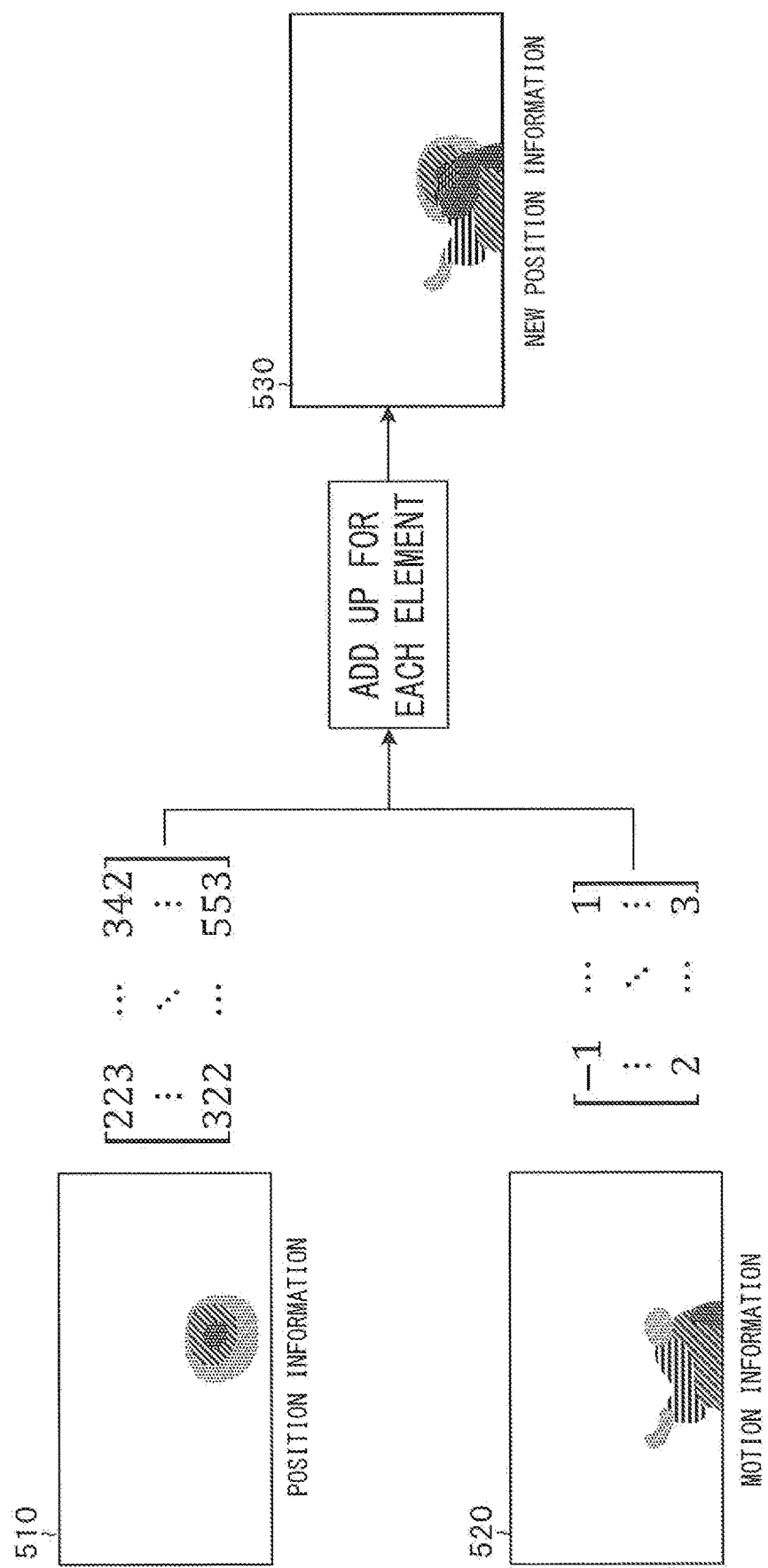
FIG. 4 is a diagram illustrating an example of generating new position information 530.

The region information generation unit 114 may generate the region information 540 according to the region estimation algorithm 230. For example, the region information generation unit 114 may generate the region information 540 based on integrating the position information 510 and the motion information 520. For example, the region information generation unit 114 may generate the region information 540 based on adding up the position information 510 and the motion information 520, for each position. For example, the region information generation unit 114 may generate new position information 530 based on the position information 510 and the motion information 520. FIG. 4 is a diagram illustrating an example of generating the new position information 530. In FIG. 4, the position information 510 is a position matrix indicating each of X and Y coordinates of positions having, for example, a degree of effect or degree of importance more than a predetermined value (a position important for identification of the object 100). In FIG. 4, the motion information 520 is a position information matrix indicating difference between the X and Y coordinates of the position and X and Y coordinates of a destination position for each position in the frame t−1. The region information generation unit 114 may generate the new position information 530 by adding up a matrix of the position information 510 and a matrix of the motion information 520 for each element, for example. Specifically, the addition may be performed for each element of which coordinates match between the position information 510 and the motion information 520. As a result, the position that affects identification of the object 100 in the frame t−1 may be converted into a position after movement in the frame t. For other positions, the motion information 520 may be received as is by the new position information 530.

The region information generation unit 114 estimates a region corresponding to the position of the object 100 based on the new position information 530. For example, in the new position information 530, the region information generation unit 114 may identify one or more areas of positions each having the same or similar moving distance and moving direction each other as one or more candidates for a location of the object. Furthermore, the region information generation unit 114 may identify an area of positions that affects the identification in the new position information 530 after movement. Among candidates for the location of the object, the region information generation unit 114 may estimate that a candidate including the area of the position that affects the identification after the movement is the location of the object 100. The region information generation unit 114 may set a region 531 circumscribing the area estimated as the location of the object 100. The region information generation unit 114 generates the region information 540 indicating the region 531.

As described above, the position information 510 indicates a position that affects identification of the object 100. In the position information 510, values of portions where the object 100 is easily visually distinguishable from objects of other classes tends to be greater than values of other portions. Therefore, the position information 510 is likely to indicate a rough position of the object 100 or a part of the object 100. Therefore, the position information 510 does not always accurately indicate an entire area in which the object 100 is present. Meanwhile, the motion information 520 indicates a motion of the object 100. Assuming that the object 100 is in motion between the frame t−1 and the frame t, in the motion information 520, a motion is likely to be indicated over an entire area where the object 100 is present. However, in a case where an object in motion other than the object 100 to be detected is present in the frame image, it is indicated that a motion is made in its area as well. Therefore, it is difficult to determine the location of the object 100 only with the motion information 520. At least either a direction in which an object moves or a distance an object moves may be different between objects. Thus, by integrating the position information 510 and the motion information 520, it is possible to identify an area including the position that affects identification of the object 100 among a plurality of areas where a motion is made in the frame image. Therefore, by the new position information 530, it is possible to accurately estimate a region where the object 100 is present.

Figure 5:
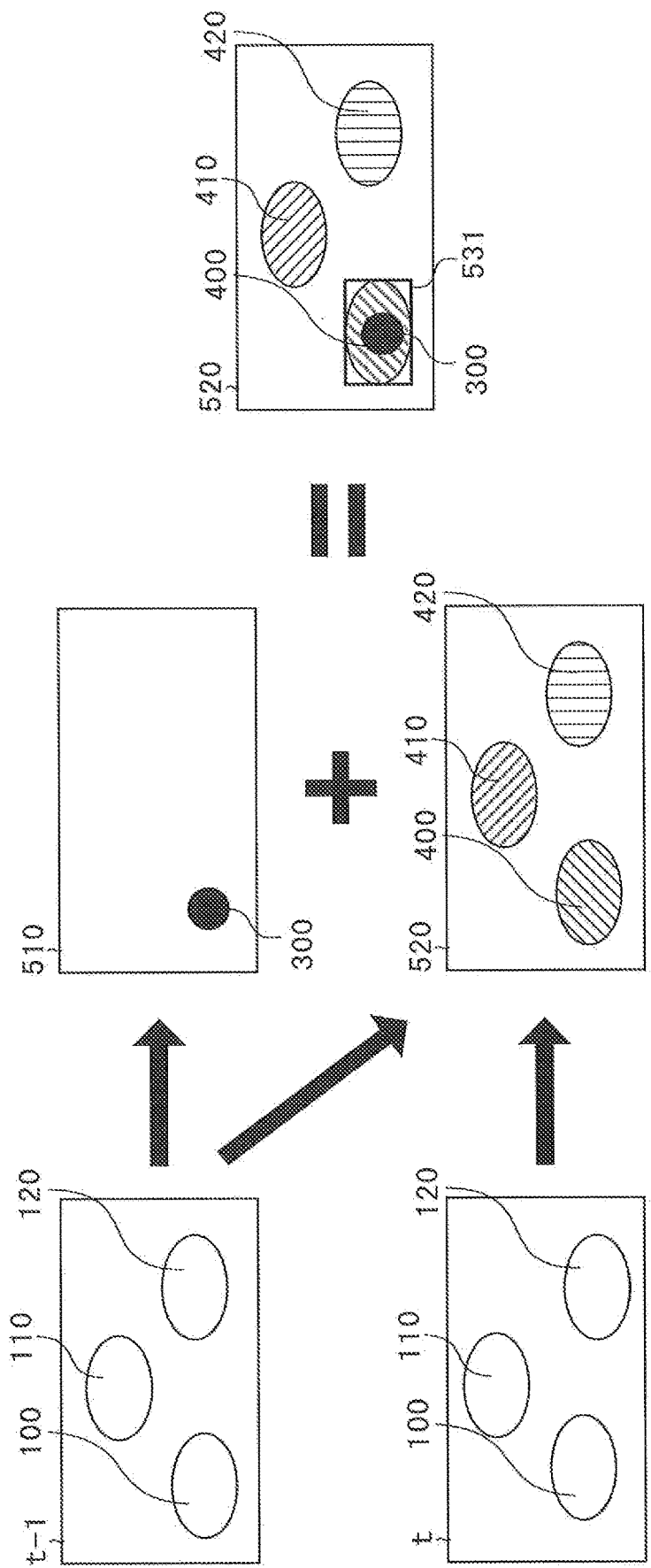
FIG. 5 is a diagram illustrating an example of estimating a region corresponding to a position of an object 100.

FIG. 5 is a diagram illustrating an example of estimating a region corresponding to a position of the object 100. It is assumed that objects 100, 110, and 120 in motion are captured and video data is generated. Classes of the objects 100, 110, and 120 are different from each other. As illustrated in FIG. 5, the frame t−1 includes the objects 100, 110, and 120. In a case where the position information 510 is generated for a class of the object 100, the position information 510 indicates, for example, a position 300, which is a part of positions where the object 100 is present, as a position that affects the identification. In the motion information 520 generated based on the frame t−1 and the frame t, it is indicated that a motion is made in areas 400, 410, and 420 in which the objects 100, 110, and 120 are present, respectively. In the new position information 530 generated by integrating the position information 510 and the motion information 520, the area 400 among the areas 400, 410, and 420 overlaps with the position 300. Therefore, the region 531 that surrounds the area 400 for example, is estimated.

[2-2. Learning Stage]

Figure 6:
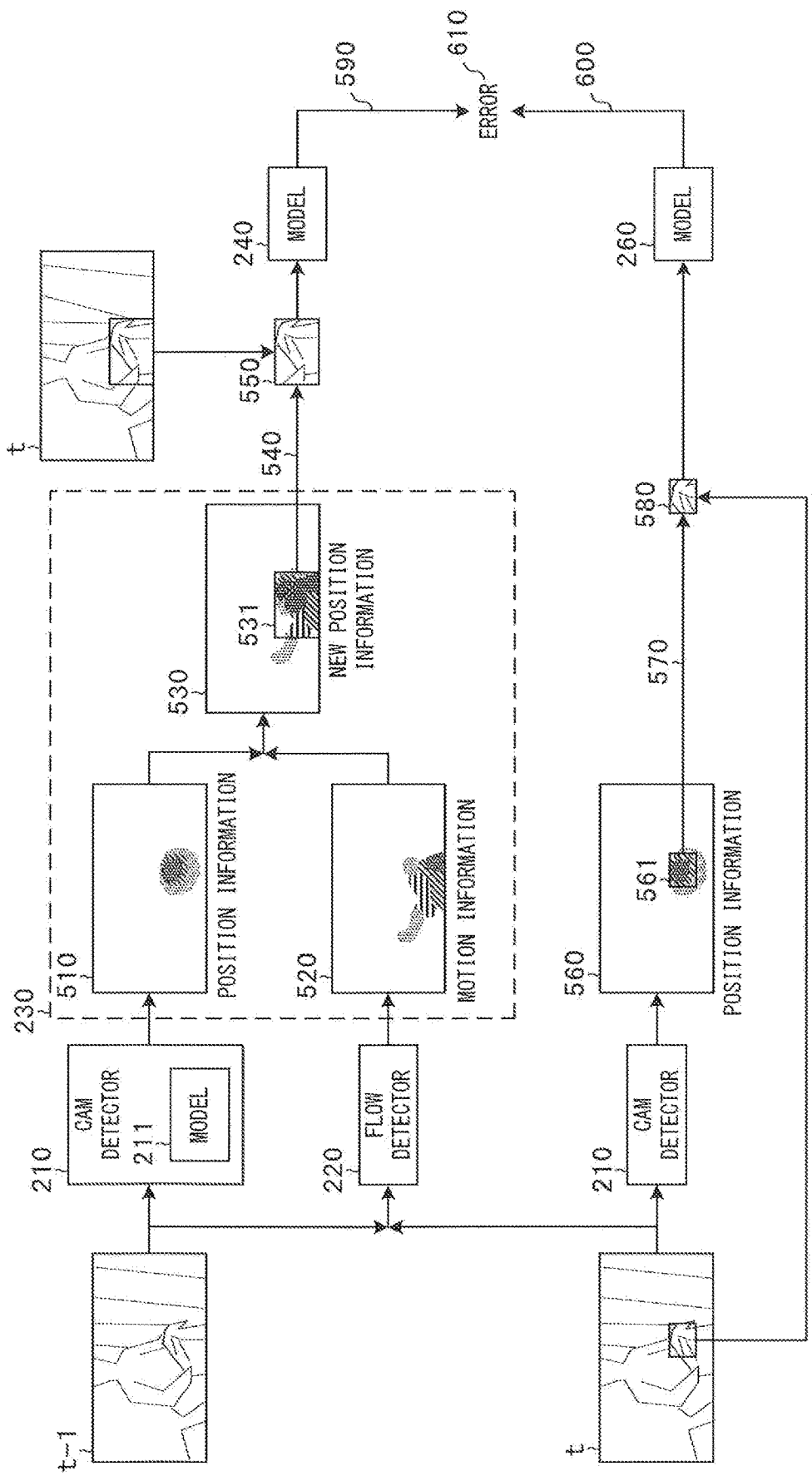
FIG. 6 is a diagram illustrating an example of a processing flow of the image processing device 1 on a learning stage.

FIG. 6 is a diagram illustrating an example of a processing flow of the image processing device 1 on a learning stage. The image processing device 1 generates the model 2 for detecting an object by weak supervised learning. Normally, in a case where a model for detecting an object is generated, region information is required as a label to be included in the training data. Region information requires manual annotation by a human. Furthermore, even with semi-supervised learning, manual annotation for region information cannot be completely excluded. In contrast, the image processing device 1 generates a model for detecting an object without manual annotation for region information by a human. As a result, a work cost for annotation can be omitted. The label required to generate the model 2 is a class of the object.

On the learning stage, the frame acquisition unit 111 acquires the training data. The training data includes video data and a label of a class. For example, the training data may be previously stored in the storage unit 14.

By inputting the frame t−1 to the model 211, the position information acquisition unit 112 acquires, from the CAM detector 210, the position information 510 corresponding to the class acquired as the label by the frame acquisition unit 111. By further inputting the frame t to the model 211, the position information acquisition unit 112 acquires, from the CAM detector 210, the position information 560 corresponding to the class acquired as the label. In a case where the position information acquisition unit 112 sequentially acquires frame images from the video data and the position information acquisition unit 112 inputs the sequential frame images to the model 211, acquisition of the position information 560 means acquisition of the position information 510.

Functions of the motion information acquisition unit 113 and the region information generation unit 114 are as described in 3-1.

The training unit 115 trains the model 211 based on the region information 540 generated by the region information generation unit 114.

For example, the training unit 115 extracts an image 550 of the region 531 indicated by the region information 540 from the frame t.

Furthermore, based on position information 560 acquired by the position information acquisition unit 112, the training unit 115 generates region information 570 indicating a region 561 in the frame t and corresponds to the position that affects identification of the object 100. For example, in the position information 560, the training unit 115 may identify an area including positions each having a value indicating a degree of effect or degree of importance equal to or more than a predetermined value. The training unit 115 may set the region 561 circumscribing the identified area. A shape of the region 561 may be rectangular. The region information 570 may include coordinates and size of the region 561.

The training unit 115 extracts an image 580 of the region 561 indicated by the region information 570 from the frame t.

The training unit 115 updates weights of the model 211 based on the image 550 and the image 580. Biases of the model 211 may be further updated.

For example, the training unit 115 acquires a feature of the image 550. For example, the training unit 115 may acquire feature information 590 indicating a feature of the image 550 by inputting the image 550 to a model 240. The model 240 is a model that extracts a feature of an image. The model 240 may be a classifier. The model 240 may be a CNN. For example, the model 240 may include convolutional layers, pooling layers, fully connected layers, and a softmax function. In the model 240, the convolutional layers and the pooling layers generate feature maps of the image 550. The fully connected layers convert the generated feature maps to generate the feature information 590. The feature information 590 may be, for example, one-dimensional vectors.

Furthermore, the training unit 115 acquires a feature of the image 580. For example, the training unit 115 may acquire feature information 600 indicating a feature of the image 580 by inputting the image 580 to a model 260. A structure and function of the model 260 may be the same as a structure and function of the model 240. The model 240 and the model 260 may share weights. Alternatively, the model 240 may also serve as the model 260.

The training unit 115 may update weights of the model 211 based on a feature of the image 550 and a feature of the image 580. For example, the training unit 115 may calculate or acquire an error 610 between the feature information 590 and the feature information 600. For example, the error 610 is calculated by using a predetermined loss function. The training unit 115 may update weights of the model 211 based on the calculated error 610. For example, the training unit 115 backpropagates the error 610. As a result, the training unit 115 updates weights of the models 240 and 260, and further updates the weights of the model 211. The models 211, 240, and 260 are trained so that the feature information 590 and the feature information 600 are close to each other by backpropagation.

In an example described by using FIG. 4, it is presumed that, when motions are added to important positions that affect identification of the object 100 in the frame t−1 by integrating the position information 510 and the motion information 520, the positions are converted to positions in the frame t. From this point of view, it is assumed that the important position indicated by the new position information 530 and the important position indicated by the position information 560 correspond to each other. Furthermore, the region information 570 indicates the region 561 corresponding to a position that affects identification of the object 100 in the frame t. Therefore, it can be said that a feature of the image 580 extracted from the region 561 represents a feature of the object 100. Thus, by training the model 211 so that the feature information 590 and the feature information 600 are close to each other, appropriate learning is performed. Then, accuracy of estimation of the region 531 where the object 100 is present, using the new position information 530, is improved as compared with accuracy before the learning.

The training unit 115 may train the models 240, 260, and 211 further based on a classification error between the class acquired as the label and an identification result of the class by the model 240. For example, the training unit 115 may update weights of the models 240, 260, and 211 by backpropagating the classification error.

After the model 211 finishes learning, the training unit 115 stores the model 2 in the storage unit 14. Since a part, of the model 2, whose parameters are updated by learning is the model 211, the training unit 115 is only required to store the model 211 in the storage unit 14.

[2-3. Practical Stage]

Figure 7:
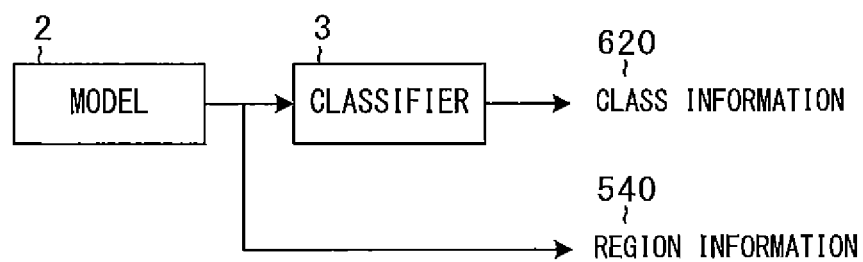
FIG. 7 is a diagram illustrating an example of a processing flow of the image processing device 1 on a practical stage.

FIG. 7 is a diagram illustrating an example of a processing flow of the image processing device 1 on a practical stage.

In the practical stage after the learning is terminated, the frame acquisition unit 111 may sequentially acquire frame data from the video taking unit 20 in real time, for example, while the video taking unit 20 is taking a video. Alternatively, the frame acquisition unit 111 may acquire frame image data from the video data previously stored in the storage unit 14. Alternatively, the frame acquisition unit 111 may acquire frame image data from video data transmitted by streaming from another computer via the network.

By inputting the frame t−1 to the model 211, the position information acquisition unit 112 may acquire, from the CAM detector 210, the position information 510 corresponding to each of one or more classes. In a case where the object 100 of one predetermined class is detected, the position information acquisition unit 112 may acquire only position information 510 corresponding to the class. In a case where the class of the object 100 is identified, the position information acquisition unit 112 may acquire position information 510 of each of all the classes, for example. Alternatively, the position information acquisition unit 112 may acquire, among a plurality of identifiable classes for example, position information 510 for each of one or more classes having a value indicating existence probability output from the model 211 is equal to or greater than a predetermined value.

A function of the motion information acquisition unit 113 is as described in 3-1.

The region information generation unit 114 generates the region information 540 for each of classes for which the motion information 520 is acquired by the motion information acquisition unit 113. In a case where the object 100 of one predetermined class is detected, the region information generation unit 114 may output only the region information 540 as a detection result of the object 100.

The detection unit 116 may detect the object 100 by inputting, to a model 3, the image 550 of the region 531 indicated by the region information 540 acquired by the region information generation unit 114, in the frame t acquired by the frame acquisition unit 111. The model 3 is a model that identifies an object in an image. The model 3 may be, for example, a classifier. The model 3 may be a CNN. The model 3 may be the model 240 for which learning has been completed. The model 3 generates class information 620 from the image 550. The class information 620 is information indicating a class of the object in the image 550. For example, the class information 620 may include a value indicating existence probability of an object of each of the classes. Alternatively, the class information 620 may be information that identifies the class of the object having a highest existence probability in the image 550, among the plurality of identifiable classes.

For each of the classes of which the image 550 is extracted, the detection unit 116 may input the image 550 to the model 3 and acquire class information. The detection unit 116 may identify existence probability of a class from the class information for each of the classes of which the image 550 is extracted. Then, the detection unit 116 may output, as the detection result of the object 100, class information of the class having a highest existence probability and the region information 540 generated for that class. Alternatively, the detection unit 116 may output the class information and the region information 540 for each of the classes having an existence probability equal to or higher than a predetermined value.

Examples of an output destination of the detection result of the object 100 include the RAM 11c, the storage unit 14, the display unit 17, a computer other than the image processing device 1, and the like.

[3. Operation of Image Processing Device]

Figure 8:
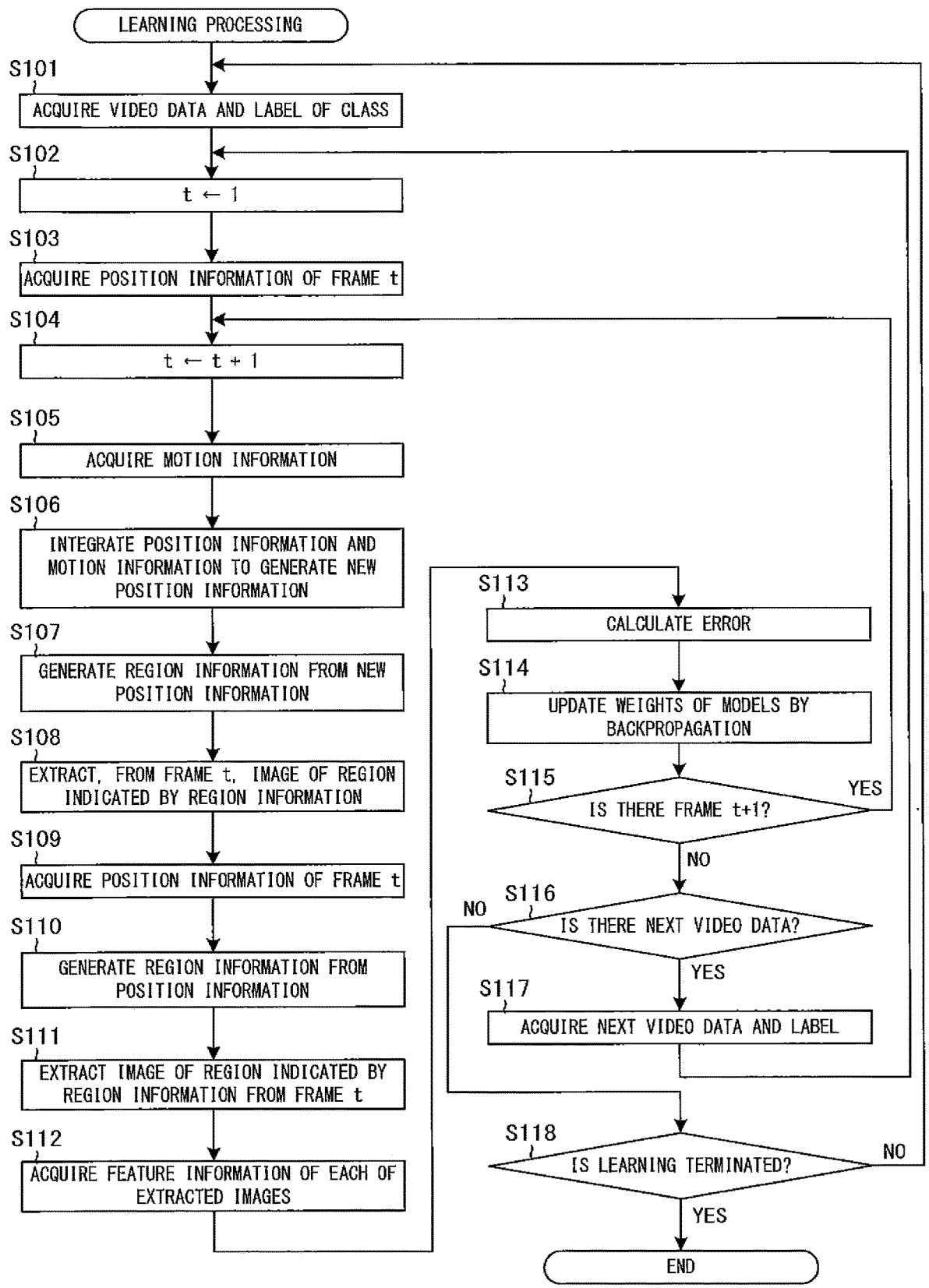
FIG. 8 is a flowchart illustrating an example of learning processing by the system control unit 11 and GPU 18 of the image processing device 1.

Next, operation of the image processing device 1 will be described by using FIGS. 8 and 9. FIG. 8 is a flowchart illustrating an example of learning processing by the system control unit 11 and GPU 18 of the image processing device 1. The system control unit 11 and the GPU 18 execute learning processing according to program codes included in a program for model generation. For example, the learning processing may be executed according to an instruction from an operator using the input unit 16.

As illustrated in FIG. 8, the frame acquisition unit 111 acquires a first set of video data and a label of a class included in the training data stored in the storage unit 14 (Step S101). Next, the frame acquisition unit 111 sets a frame number t to 1 (Step S102). The frame acquisition unit 111 acquires the frame t from acquired video data. Next, the position information acquisition unit 112 acquires the position information 510 corresponding to the class acquired as the label by inputting the frame t to the model 211 (Step S103).

Next, the frame acquisition unit 111 increases the frame number t by 1 (Step S104). The frame acquisition unit 111 acquires the frame t from acquired video data. Next, the motion information acquisition unit 113 acquires the motion information 520 by inputting the frame t−1 and the frame t to the flow detector 220 (Step S105). The frame t−1 at this time is the frame acquired in Step S102.

Next, the region information generation unit 114 integrates the position information 510 and the motion information 520 to generate the new position information 530 (Step S106). Next, the region information generation unit 114 generates region information 540 based on the generated new position information 530 (Step S107). Next, the region information generation unit 114 extracts, from the frame t, an image 550 of the region 531 indicated by the region information 540 (Step S108).

Next, the training unit 115 acquires the position information 510 of the class acquired as the label by inputting the frame t to the model 211 (Step S109). Next, the training unit 115 generates region information 570 based on the acquired position information 510 (Step S110). Next, the training unit 115 extracts an image 580 of the region 561 indicated by the region information 570 from the frame t (Step S111).

Next, the training unit 115 acquires the feature information 590 by inputting the extracted image 550 to the model 240. Furthermore, the training unit 115 acquires the feature information 600 by inputting the extracted image 580 to the model 260. (Step S112). Next, the training unit 115 calculates the error 610 between the feature information 590 and the feature information 600 (Step S113). Next, the training unit 115 updates weights and biases of the models 240, 260, and 211 by backpropagating the calculated error 610 (Step S114). Note that, although weights are updated for each frame for convenience of description, the weights may be updated for each batch including a predetermined number of frames or for each video data, for example.

Next, the training unit 115 determines whether or not there is a frame t+1 in the acquired video data (Step S115). In a case where there is a frame t+1 (Step S115: YES), the processing proceeds to Step S104. On the other hand, in a case where there is no frame t+1 (Step S115: NO), the training unit 115 determines whether or not the next video data is included in the training data (Step S116). In a case where there is next video data (Step S116: YES), the frame acquisition unit 111 acquires a next set of the video data and a label of a class from the training data (Step S117), and the processing proceeds to Step S102. On the other hand, in a case where there is no next video data (Step S116: NO), the training unit 115 determines whether or not to terminate the learning (Step S118). For example, in a case where learning is executed for a number of times corresponding to a preset number of epochs, the training unit 115 may judge that the learning is to be terminated. Alternatively, the training unit 115 may calculate the error 610 by detecting the object by using test data. The training unit 115 may judge that the learning is to be terminated in a case where an average value of the calculated errors 610 is less than a predetermined value. In a case where the learning is not terminated (Step S118: NO), the processing proceeds to Step S101. In a case where the learning is terminated (Step S118: YES), the learning processing ends.

Figure 9:
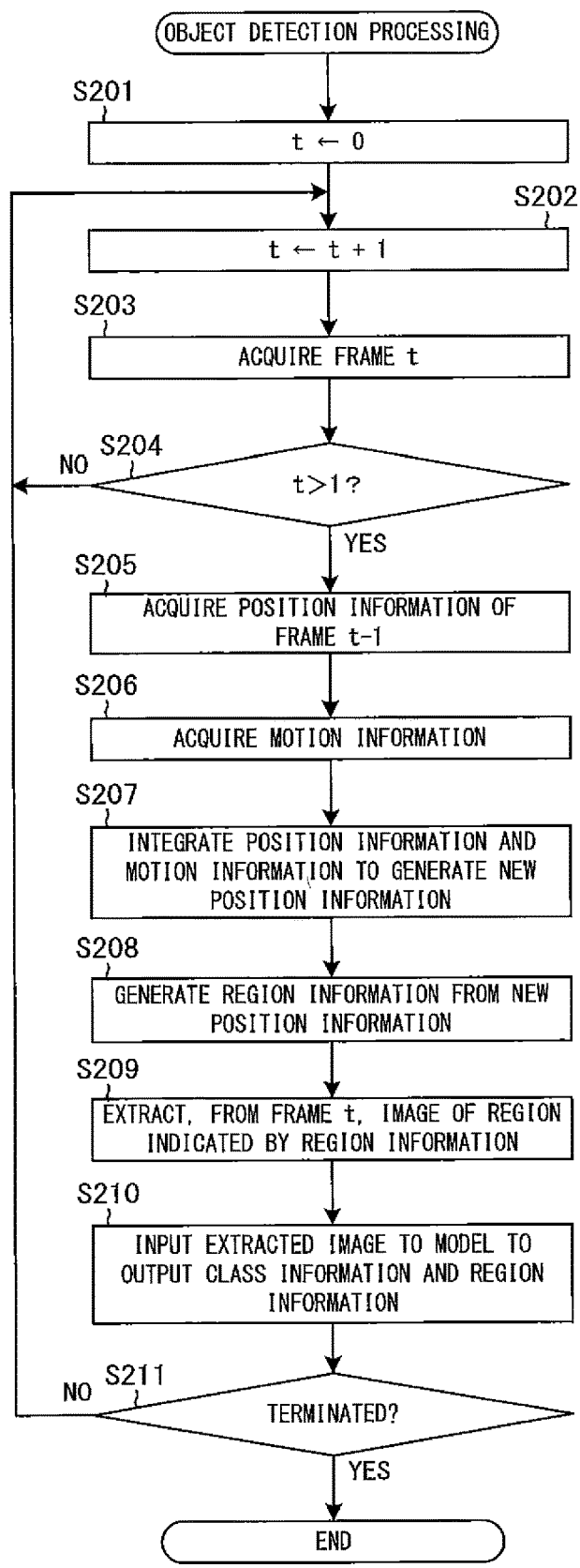
FIG. 9 is a flowchart illustrating an example of object detection processing by the system control unit 11 and GPU 18 of the image processing device 1.

FIG. 9 is a flowchart illustrating an example of object detection processing by the system control unit 11 and GPU 18 of the image processing device 1. The processing example illustrated in FIG. 9 is a processing example of a case where an object is detected in real time from a video taken by the video taking unit 20. For example, the object detection processing is executed by using the model 211 for which learning by the learning processing illustrated in FIG. 8 has been completed. The system control unit 11 and the GPU 18 execute object detection processing according to program codes included in the program for object detection. For example, the object detection processing may be executed when the video taking unit 20 starts taking a video based on an instruction from the system control unit 11.

As illustrated in FIG. 9, the frame acquisition unit 111 sets the frame number t to 0 (Step S201). Next, the frame acquisition unit 111 increases the frame number t by 1 (Step S202). Next, the frame acquisition unit 111 acquires a latest frame as the frame t from the video taking unit 20 (Step S203).

Next, the frame acquisition unit 111 determines whether or not the frame number t is greater than 1 (Step S204). In a case where the frame number t is not greater than 1 (Step S204: NO), the processing proceeds to Step S202.

On the other hand, in a case where the frame number t is greater than 1 (Step S204: YES), the position information acquisition unit 112 acquires the position information 510 by inputting the frame t−1 to the model 211 (Step S205). Here, the position information acquisition unit 112 acquires the position information 510 corresponding to each of one or more classes based on the identification result output from the model 211.

Next, the motion information acquisition unit 113 acquires the motion information 520 by inputting the frame t−1 and the frame t to the flow detector 220 (Step S206).

Next, the region information generation unit 114 integrates the position information 510 and the motion information 520 for each class for which position information 510 is acquired, to generate the new position information 530 (Step S207). Next, based on the generated new position information 530, the region information generation unit 114 generates region information 540 for each class for which the new position information 530 is acquired (Step S208). Next, for each class for which the region information 540 is generated, the region information generation unit 114 extracts an image 550 of the region 531 indicated by the region information 540 from the frame t (Step S209).

Next, the detection unit 116 acquires the class information 620 by inputting the image 550 to the model 3 for each class for which the image 550 is generated. The detection unit 116 outputs the class information 620 and the region information 540 based on the identification result by the model 3 (Step S210).

Next, the detection unit 116 determines whether or not to terminate the object detection (Step S211). A condition for terminating the object detection may be predetermined according to application of the image processing device 1. In a case where the object detection is not terminated (Step S211: NO), the processing proceeds to Step S202. On the other hand, in a case where the object detection is terminated (Step S211: YES), the object detection processing ends.

As described above, according to the present embodiment, the image processing device 1 acquires the frame t−1 and the frame t. Furthermore, the image processing device 1 inputs the frame t−1 to the model 211 and acquires position information 510 indicating a position that is in the frame t−1 and affects identification of the object 100 in the frame t−1. Furthermore, the image processing device 1 acquires the motion information 520 indicating a motion of the object 100 in the frame t−1 based on the frame t−1 and frame t. Furthermore, based on the acquired position information 510 and the motion information 520, the image processing device 1 generates region information 540 indicating a region that is in the frame t−1 and corresponds to a position where the object 100 is present. Therefore, region information 540 indicating a region corresponding to a position where the object 100 is present is generated based on the position information 510 and the motion information 520. The position information 510 indicates a position that affects identification of the object 100 in the frame image. Therefore, the position information 510 is likely to indicate a location of at least a certain area in the location where the object 100 is present. The motion information 520 indicates a motion of the object 100. Therefore, in a case where the object 100 is in motion, the motion information 520 is likely to indicate at least an entire location where the object 100 is present. Therefore, by generating region information 540 by using these pieces of information, it is possible to accurately identify a region corresponding to a position where the object 100 is present in the image.

Here, the image processing device 1 may generate the region information 540 based on integrating the position information 510 and the motion information 520. In this case, in the frame image, among a plurality of areas where a motion is made, an area corresponding to a position that affects identification of the object 100 is identified by integrating the position information 510 and the motion information 520. Therefore, it is possible to accurately identify a region corresponding to a position where the object 100 is present.

Here, the image processing device 1 may generate the motion information 520 indicating a moving direction and moving distance of the object 100 for each position in the frame t−1. Furthermore, the image processing device 1 may generate the region information 540 by adding up the position information 510 and the motion information 520, for each position. In this case, the position that affects identification of the object 100 is changed by a moving direction and moving distance at the position.

Furthermore, the image processing device 1 may detect the object 100 of the frame t by inputting, to the model 3 that identifies the object 100 in the image, the image 550 of the region that is in the frame t and is indicated by the acquired region information 540. In this case, in the frame image, the image 550 corresponding to the region indicated by the generated region information 540 is input to the model 3 that identifies the object 100 in the image. Therefore, the object 100 in the frame image is identified by the model 3. Furthermore, the region 531 corresponding to a position of the object 100 is indicated by the region information 540. Therefore, the object 100 in the frame image can be accurately detected. Furthermore, because highly accurate region information 540 is automatically generated, it is possible to detect the object 100 without machine learning that requires annotations of region information by a human.

Furthermore, the image processing device 1 may train the model 211 based on the generated region information 540. In this case, the model 211 is trained based on the automatically generated region information 540, and therefore, an annotation of region information by a human is unnecessary for machine learning for identifying the region 531 corresponding to a position of the object 100.

Here, the image processing device 1 may further input the frame t to the model 211 and acquire second position information 560 indicating a position that is in the frame t and affects identification of the object 100 in the frame t. Furthermore, the image processing device 1 may extract the image 550 of the region 531 indicated by the acquired region information 540 from the frame t. Furthermore, based on acquired second position information 510, the image processing device 1 may generate region information 570 indicating a region 560 that is in the frame t and corresponds to a position that affects identification of the object 100. Furthermore, the image processing device 1 may extract the image 580 of the region 561 indicated by the acquired region information 570 from the frame t. Furthermore, the image processing device 1 may update weights of the model 211 based on the acquired image 550 and image 580. In a case where a position that is indicated by the position information 510 and affects identification of the object 100 in the frame t−1 is changed by a motion indicated by the motion information 520, a position after the change is considered to be corresponding to a position that affects identification of the object 100 in the frame t. Therefore, the model 211 can be appropriately trained by using the image 550 and the image 580.

Here, the image processing device 1 may acquire a feature of the extracted image 550. Furthermore, the image processing device 1 may acquire a feature of the extracted image 580. Furthermore, the image processing device 1 may update weights of the model 211 based on these acquired features. The region information 570 indicates a region corresponding to a position that affects identification of the object 100 in the frame t. Therefore, a feature of the image 580 extracted from the region indicates a feature of the object 100 to be detected. Thus, the model 211 can be appropriately trained by, for example, weights being updated so that features of the image 550 and the image 580 are close to each other.

Furthermore, the position information 510 may be at least a part of a class activation map.

Furthermore, the motion information 520 may be an optical flow.

REFERENCE SIGNS LIST

1 Image processing device
11 System control unit

12 System bus
13 Input/output interface
14 Storage unit
15 Communication unit
16 Input unit
17 Display unit
18 GPU
19 GPU memory
20 Display unit
111 Frame acquisition unit
112 Position information acquisition unit
113 Motion information acquisition unit
114 Region information generation unit
115 Training unit
116 Detection unit
2, 3, 211, 240, 260 Model
210 CAM detector
220 Flow detector
230 Region estimation algorithm

The invention claimed is:

1. An object region identification device comprising:
at least one memory configured to store computer program code,
at least one processor configured to access the memory and operate as instructed by the computer program code, the computer program code including;
frame image acquisition code configured to cause at least one of the at least one processor to acquire a first frame image and a second frame image that are temporally successive;
position information acquisition code configured to cause at least one of the at least one processor to input the first frame image to a model configured to identify an object in the first frame image and acquire position information indicating a position in the first frame image, the position affecting identification of the object in the first frame image, wherein the identifying an object includes generating one or more feature maps of the first frame image and a value indicating existence of each of one or more classes in the first frame image, and wherein the acquiring position information includes calculating a gradient of a final layer of the model based on at least one class of the one or more classes, calculating a weight of each of the one or more feature maps based on the calculated gradient, and generating the position information based on at least the one or more feature maps;
motion information acquisition code configured to cause at least one of the at least one processor to acquire motion information indicating a motion of the object in the first frame image based on the first frame image and the second frame image;
region information generation code configured to cause at least one of the at least one processor to generate, based on the acquired position information and motion information, region information indicating a region in the second frame image, the region corresponding to a position of the object; and
processing code configured to cause at least one of the at least one processor to process the region in the second frame image indicated by the generated region information by using a predetermined image processing to output a result of the processing.

2. The object region identification device according to claim 1, wherein the region information generation code is configured to cause at least one of the at least one processor to generate the region information based on integrating the position information and the motion information.

3. The object region identification device according to claim 2,
wherein the motion information acquisition code is configured to cause at least one of the at least one processor to generate the motion information indicating a moving direction and a moving distance of the object for each of positions in the first frame image, and
the region information generation code is configured to cause at least one of the at least one processor to generate the region information based on adding up the position information and the motion information for each position.

4. The object region identification device according to claim 1, wherein
the processing code is configured to cause at least one of the at least one processor to detect the object in the second frame image by inputting, to a second model configured to identify the object in the second frame image, an image corresponding to the region in the second frame image indicated by the generated region information.

5. The object region identification device according to claim 1, further comprising training code configured to cause at least one of the at least one processor to train the model based on the generated region information.

6. The object region identification device according to claim 5,
wherein the position information acquisition code is configured to cause at least one of the at least one processor to input the second frame image to the model and acquire a second position information indicating a position in the second frame image, the position in the second frame image affecting identification of the object in the second frame image, and
the training code further includes
first extraction code configured to cause at least one of the at least one processor to extract a first image corresponding to a region indicated by the generated region information from the second frame image,
second region information generation code configured to cause at least one of the at least one processor to generate, based on the acquired second position information, second region information indicating a region in the second frame image, the region in the second frame image corresponding to a position that affects identification of the object,
second extraction code configured to cause at least one of the at least one processor to extract, from the second frame image, a second image corresponding to a region indicated by the acquired second region information, and
update code configured to cause at least one of the at least one processor to update weights of the model based on the acquired first image and second image.

7. The object region identification device according to claim 6,
wherein the training code further includes
first feature acquisition code configured to cause at least one of the at least one processor to acquire a feature of the extracted first image, and
second feature acquisition code configured to cause at least one of the at least one processor to acquire a feature of the extracted second image, and the update code is configured to cause at least one of the at least one processor to update the weights of the model based on the acquired first feature and second feature.

8. The object region identification device according to claim 1, wherein the position information is at least a part of a class activation map.

9. The object region identification device according to claim 1, wherein the motion information is an optical flow.

10. The object region identification device according to claim 1, wherein based on a value of the position affecting identification of the object in the one or more feature maps, the value indicating the existence of a class of the object changes more than values of other positions in the one or more feature maps.

11. The object region identification device according to claim 1, wherein the acquired motion information indicates one or more motion areas in which respective motions are present in the first frame image,
wherein the region information generation code is configured to cause at least one of the at least one processor to identify a motion area including the position indicated by the acquired position information among the one or more motion areas indicated by the acquired motion information and generate region information such that the region indicated by the region information covers the identified motion area.

12. An object region identification method performable by a computer, the method comprising:
acquiring a first frame image and a second frame image that are temporally successive;
inputting the first frame image to a model configured to identify an object in an image and acquire position information indicating a position in the first frame image, the position affecting identification of the object in the first frame image, wherein the identifying an object includes generating one or more feature maps of the first frame image and a value indicating existence of each of one or more classes in the first frame image, and wherein the acquiring position information includes calculating a gradient of a final layer of the model based on at least one class of the one or more classes, calculating a weight of each of the one or more feature maps based on the calculated gradient, and generating the position information based on at least the one or more feature maps;
acquiring motion information indicating a motion of the object in the first frame image based on the first frame image and the second frame image;
generating, based on the acquired position information and motion information, region information indicating a region in the second frame image, the region corresponding to a position of the object; and
processing the region in the second frame image indicated by the generated region information by using a predetermined image processing to output a result of the processing.

13. The object region identification method according to claim 12, wherein based on a value of the position affecting identification of the object in the one or more feature maps, the value indicating the existence of a class of the object changes more than values of other positions in the one or more feature maps.

14. The object region identification method according to claim 12, wherein the acquired motion information indicates one or more motion areas in which respective motions are present in the first frame image,
wherein the region information generation further includes identifying a motion area including the position indicated by the acquired position information among the one or more motion areas indicated by the acquired motion information and generate region information such that the region indicated by the region information covers the identified motion area.

15. A non-transitory computer readable medium storing thereon an object region identification program causing a computer to:
acquire a first frame image and a second frame image that are temporally successive;
input the first frame image to a model configured to identify an object in an image and acquire position information indicating a position in the first frame image, the position affecting identification of the object in the first frame image, wherein the identifying an object includes generating one or more feature maps of the first frame image and a value indicating existence of each of one or more classes in the first frame image, and wherein the acquiring position information includes calculating a gradient of a final layer of the model based on at least one class of the one or more classes, calculating a weight of each of the one or more feature maps based on the calculated gradient, and generating the position information based on at least the one or more feature maps;
acquire motion information indicating a motion of the object in the first frame image based on the first frame image and the second frame image;
generate, based on the acquired position information and motion information, region information indicating a region in the second frame image, the region corresponding to a position of the object; and
process the region in the second frame image indicated by the generated region information by using a predetermined image processing to output a result of the processing.

16. The computer readable medium according to claim 15, wherein based on a value of the position affecting identification of the object in the one or more feature maps, the value indicating the existence of a class of the object changes more than values of other positions in the one or more feature maps.

17. The computer readable medium according to claim 15, wherein the acquired motion information indicates one or more motion areas in which respective motions are present in the first frame image,
wherein the region information generation further includes identifying a motion area including the position indicated by the acquired position information among the one or more motion areas indicated by the acquired motion information and generate region information such that the region indicated by the region information covers the identified motion area.

* * * * *